United States Patent
Wu et al.

(10) Patent No.: US 11,073,418 B2
(45) Date of Patent: Jul. 27, 2021

(54) LIQUID LEVEL SENSING DEVICE WITH DOUBLE-LAYER FLEXIBLE TUBE AND PACKING STRUCTURE THEREOF

(71) Applicant: FINETEK Co., Ltd., New Taipei (TW)

(72) Inventors: Ting-Kuo Wu, New Taipei (TW); Chih-Wen Wang, New Taipei (TW); Wei-Yu Chen, New Taipei (TW); Kuei-Yung Wu, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 154 days.

(21) Appl. No.: 16/528,586

(22) Filed: Jul. 31, 2019

(65) Prior Publication Data

US 2021/0033445 A1    Feb. 4, 2021

(51) Int. Cl.
*G01F 23/00* (2006.01)
*G01F 25/00* (2006.01)

(52) U.S. Cl.
CPC ...... *G01F 23/0084* (2013.01); *G01F 25/0069* (2013.01)

(58) Field of Classification Search
CPC .................................................. G01F 23/0084
See application file for complete search history.

(56) References Cited

U.S. PATENT DOCUMENTS

| 4,790,185 A * | 12/1988 | Fedelem | G01F 23/30 137/565.24 |
|---|---|---|---|
| 5,929,763 A * | 7/1999 | Koski | G01F 23/2963 340/618 |
| 7,108,216 B2 * | 9/2006 | Burke | B65H 75/4434 242/378.1 |
| 2003/0019292 A1 * | 1/2003 | Robinson | G01F 23/2927 73/293 |

* cited by examiner

*Primary Examiner* — Paul M. West
*Assistant Examiner* — Mark A Shabman
(74) *Attorney, Agent, or Firm* — Chun-Ming Shih; HDLS IPR Services

(57) ABSTRACT

A liquid level sensing device and a packing structure are provided. An outer tube fastener is connected to a signal module. A protective soft tube is connected to the outer tube fastener. An end of a double-layer flexible tube is connected to the protective soft tube. The double-layer flexible tube includes a flexible conductive outer tube and a fluorine-containing plastic inner tube coaxially attached in the flexible conductive outer tube. The fluorine-containing plastic inner tube is made of a flexible material. The flexible conductive outer tube is made of a conductive flexible material to form a grounding layer. A sensing module is disposed in the fluorine-containing plastic inner tube. A magnetic floater is assembled outside the double-layer flexible tube. A hanger is connected to another end of the double-layer flexible tube.

6 Claims, 6 Drawing Sheets

LIQUID LEVEL SENSING DEVICE WITH DOUBLE-LAYER FLEXIBLE TUBE AND PACKING STRUCTURE THEREOF

BACKGROUND OF THE INVENTION

Technical Field

The invention relates to liquid level measuring devices, particularly to flexible liquid level sensing devices.

Related Art

Liquid level sensing devices used in dangerous places must meet explosion-proof specifications and have corrosion resistant coating. Accordingly, their designs usually adopt intrinsic safety circuits or rigid metal probes. Also, rigid metal probes cannot be suitable for environments with turbulent flows or long distances because of structural strength. This makes the measuring range too limited to satisfy requirements of use.

Furthermore, a flexible liquid level sensing device adopts an engineering plastic or rubber tube to serve as an outer tube of a probe for binding storage and storage volume reduction. Plastic tubes possess great air tightness and water tightness, but they are easy to accumulate static electricity because of high resistance. Thus, plastic tubes cannot be used in explosible places such as petroleum refining or chemical plants. Also, rubber tubes can be used in dangerous places because of conductivity, but porosity of rubber material cannot accomplish complete water tightness. Thus, rubber tubes cannot be used in places with vapor.

Moreover, when a flexible liquid level sensing device which has been wound will be used again, it is hard to be moved to a desired position and hard to be pulled out. Besides, when current flexible liquid level sensing devices which are used in petrochemical, refining and chemical fields, oily gas will corrode and infiltrate flexible tubes to damage inside circuit boards or sensor and cause increase of failure rate.

SUMMARY OF THE INVENTION

An object of the invention is to provide a liquid level sensing device with a double-layer flexible tube, which can prevent flexible tubes from being infiltrated by oily gas and can be used in highly dangerous places (such as vaporous, oily gassy, corrosive or explosible). Thus, long distance measurement can be guaranteed and failure rate can be reduced.

To accomplish the above object, the invention provides a liquid level sensing device, which includes a signal module, an outer tube fastener, a protective soft tube, a double-layer flexible tube, a sensing module, a magnetic floater, and a hanger. The outer tube fastener is connected to the signal module. The protective soft tube is connected to the outer tube fastener. An end of the double-layer flexible tube is connected to the protective soft tube. The double-layer flexible tube includes a flexible conductive outer tube and a fluorine-containing plastic inner tube coaxially attached in the flexible conductive outer tube. The fluorine-containing plastic inner tube is made of a flexible material. The flexible conductive outer tube is made of a conductive flexible material to form a grounding layer. The sensing module is disposed in the fluorine-containing plastic inner tube. The magnetic floater is assembled outside the double-layer flexible tube. The hanger is connected to another end of the double-layer flexible tube.

Another object of the invention is to provide a packing structure for a liquid level sensing device with a double-layer flexible tube, which can guarantee safety of a flexible liquid level sensing device which is being moved. This can increase convenience of use.

To accomplish the above object, the invention provides a packing structure for storing the liquid level sensing device, which includes a storage box and a reel. The storage box includes a box body and partition plates disposed in the box body for dividing an inside of the box body to form a receiving room. The reel is placed in the receiving room and has a hollow shaft and a pair of annular plates. Outer peripheries of the pair of annular plates project from the hollow shaft to form a winding room. The liquid level sensing device is stored in the winding room by winding the double-layer flexible tube onto the hollow shaft. The outer tube fastener is exposed outside the pair of annular plates.

The double-layer flexible tube of the invention includes a flexible conductive outer tube and a fluorine-containing plastic inner tube coaxially attached in the flexible conductive outer tube. The fluorine-containing plastic inner tube is made of a flexible material. The flexible conductive outer tube is made of a conductive flexible material to form a grounding layer. Thus, the double-layer flexible tube of the invention accompanied with great air tightness and water tightness of plastic tubes functions as inner protection, and a rubber tube with conductivity serves as an outer layer to prevent accumulation of static electricity. As a result, the invention can be used in used in highly dangerous places (such as vaporous, oily gassy, corrosive or explosible) and tanks with irregular shapes. Also, the double-layer flexible tube of the invention has flexibility, so it can perform long distance measurement in a tank with turbulent flow. The flexible conductive outer tube is conductive, so it can serve as grounding. Accumulated charges will be drained out along the flexible conductive outer tube to avoid charge accumulation. Thus, explosive danger can be avoided to meet explosion resistance requirements. Infiltration of oily gas can be prevented. Thus, long distance measurement can be guaranteed and failure rate can be reduced. Further, the liquid level sensing device of the invention wound on the reel and positioned in the storage box can increase convenience of use and transportation and guarantee safety of a flexible liquid level sensing device which is being moved.

DETAILED DESCRIPTION OF THE INVENTION

Figure 1:
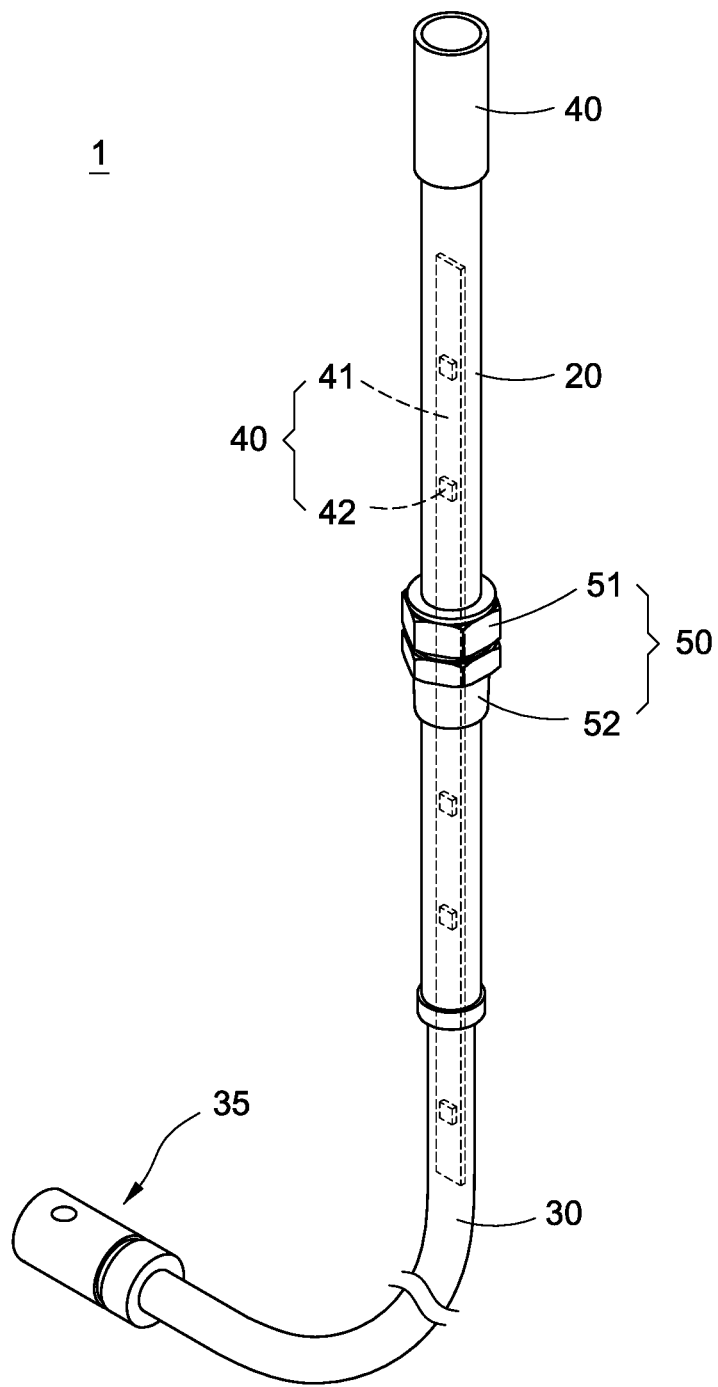
FIG. 1 is a perspective view of the flexible liquid level sensing device of the invention.
Figure 2:
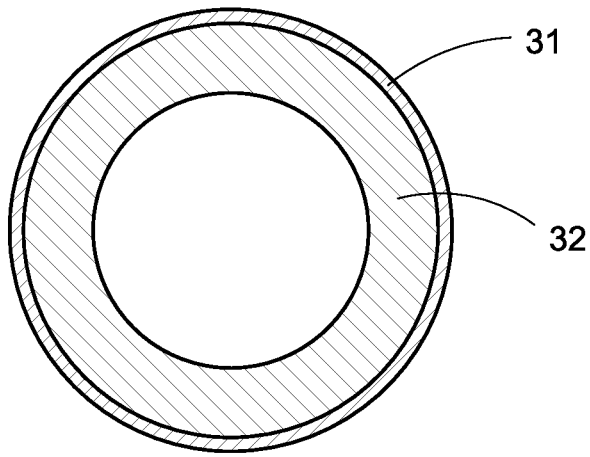
FIG. 2 is a cross-section view of the double-layer flexible tube of the invention.

Please refer to FIGS. 1 and 2. The liquid level sensing device 1 of the invention includes an outer tube fastener 10, a protective soft tube 20, a double-layer flexible tube 30, a sensing module 40 and a hanger 35. The outer tube fastener 10, the protective soft tube 20, the double-layer flexible tube 30 and the hanger 35 are connected in order. The sensing module 40 is assembled in the protective soft tube 20 and the double-layer flexible tube 30 to constitute the double-layer flexible tube liquid level sensing device 1.

Figure 6:
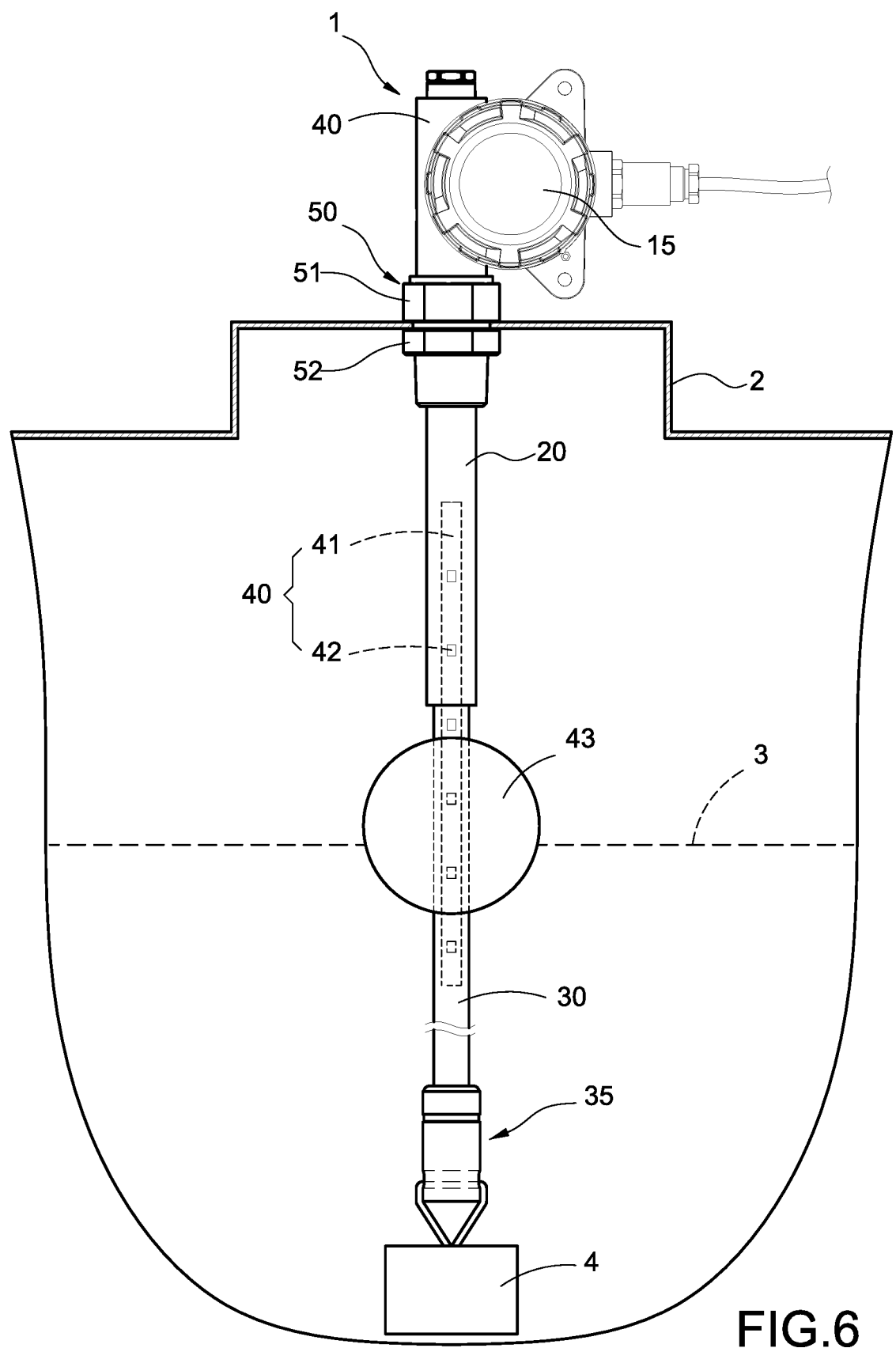
FIG. 6 is a schematic view of installing of the liquid level sensing device with a double-layer flexible tube of the invention.

The outer tube fastener 10 is connected to a signal module 15 (shown in FIG. 6). The signal module 15 serves as a controller for operation.

The protective soft tube 20 is connected to the outer tube fastener 10. In this embodiment, part of the sensing module 40 is located in the protective soft tube 20. Because the protective soft tube 20 is more inflexible than the double-layer flexible tube 30, the protective soft tube 20 can protect the sensing module 40 to make the sensing module 40 not damaged by bending. Preferably, the protective soft tube 20 is a plastic tube with strong acid and alkali resistance or other proper materials.

An end of the double-layer flexible tube 30 is connected to the protective soft tube 20 and the other end thereof is connected to the hanger 35. The double-layer flexible tube 30 includes a flexible conductive outer tube 31 and a fluorine-containing plastic inner tube 32 coaxially attached in the flexible conductive outer tube 31. A major part of the sensing module 40 is disposed in the fluorine-containing plastic inner tube 32. The fluorine-containing plastic inner tube 32 is made of a flexible material. The flexible conductive outer tube 31 is made of a conductive flexible material to form a grounding layer.

The fluorine-containing plastic inner tube 32 is primarily made of plastic containing fluorine, and the plastic containing fluorine may be polytetrafluoroethylene (PTFE), polychlorotrifluoroethylene (PCTFE), polyvinylidene fluoride (PVDF), ethylene-tetrafluoroethylene copolymer (ETFE), ethylene-chlorotrifluoroethylene copolymer (ECTFE), polyfluoride ethylene (PVF), tetrafluoroethylene-perfluoroalkyl vinyl ether copolymer (also known as fusible PTFE (PFA), tetrafluoroethylene-hexafluoropropylene copolymer (also known as fluoroplastic 46, FEP) or tetrafluoroethylene-hexafluoropropylene-perfluoroalkyl vinyl ether copolymer. PTFE is the most common.

The flexible conductive outer tube 31 is flexible metal woven mesh or is made of rubber mixed with conductive graphite, polymer material containing conductive particles or engineering plastic (such as Peek, NBR, Telfon).

In detail, a major part of the sensing module 40 is disposed in the fluorine-containing plastic inner tube 32. The fluorine-containing plastic inner tube 32 is made of polymer material with corrosion resistance and strong acid and alkali resistance or conventional polymer material with acid and alkali resistance. The fluorine-containing plastic inner tube 32 is insulative but not conductive.

The sensing module 40 is disposed in the fluorine-containing plastic inner tube 32 and includes a circuit board 41 and sensors 42 mounted thereon.

In this embodiment, the flexible liquid level sensing device 1 further includes a connecting assembly 50. The connecting assembly 50 includes a connecting cap 51 and a connecting base 52 connected thereto. In practice, the connecting cap 51 and the connecting base 52 may separately grip two sides of a wall of a tank to fix the flexible liquid level sensing device 1 on the tank to perform measurement.

The double-layer flexible tube 30 of the flexible liquid level sensing device 1 of the invention has flexibility, so it can perform long distance measurement in a tank with turbulent flow. Also, the flexible conductive outer tube 31 is conductive, so it can serve as grounding. Accumulated charges will be drained out along the flexible conductive outer tube 31 to avoid charge accumulation. Thus, explosive danger can be avoided to meet explosion resistance requirements.

Figure 3:
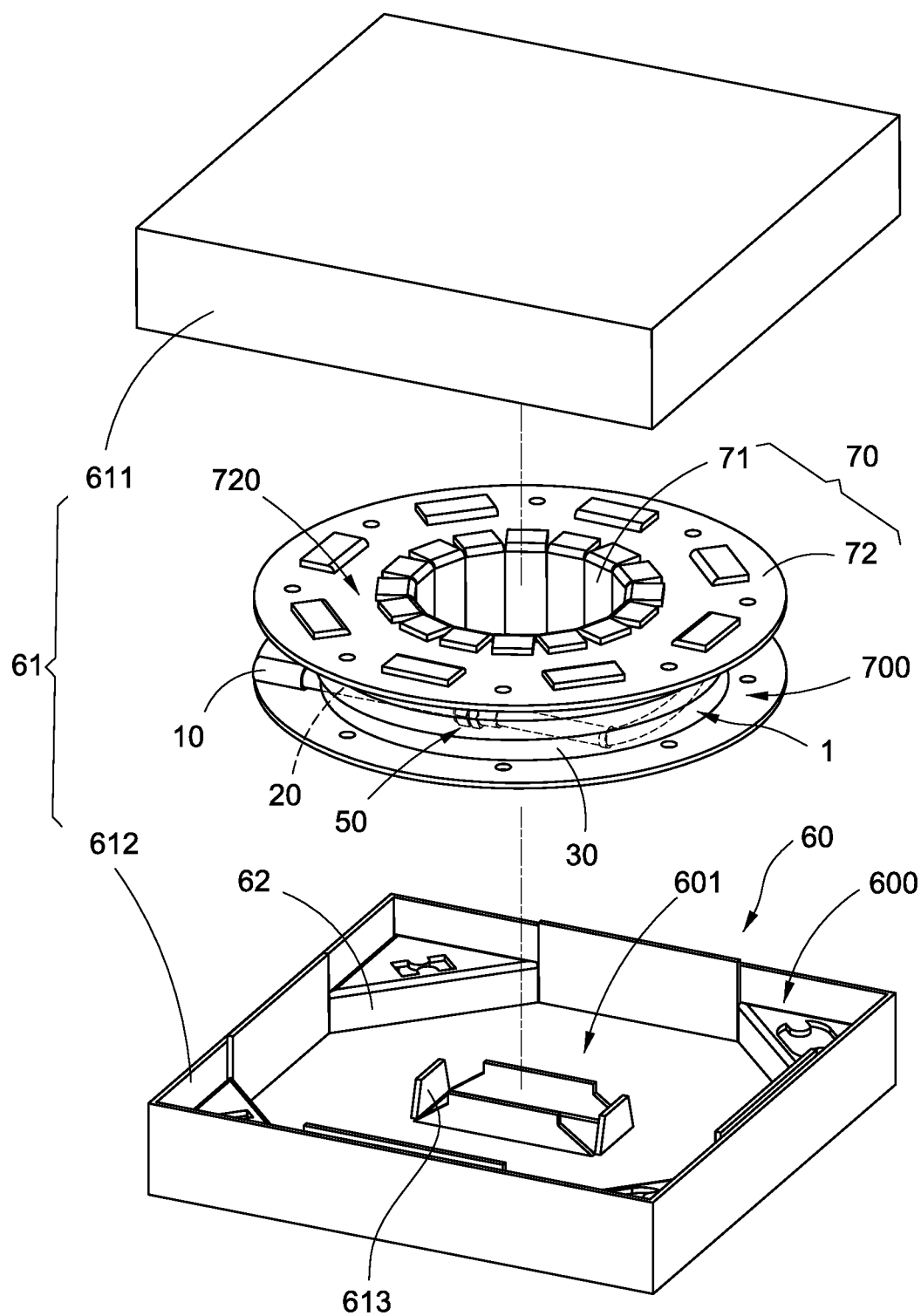
FIG. 3 is a schematic view of packing of the liquid level sensing device with a double-layer flexible tube of the invention.
Figure 4:
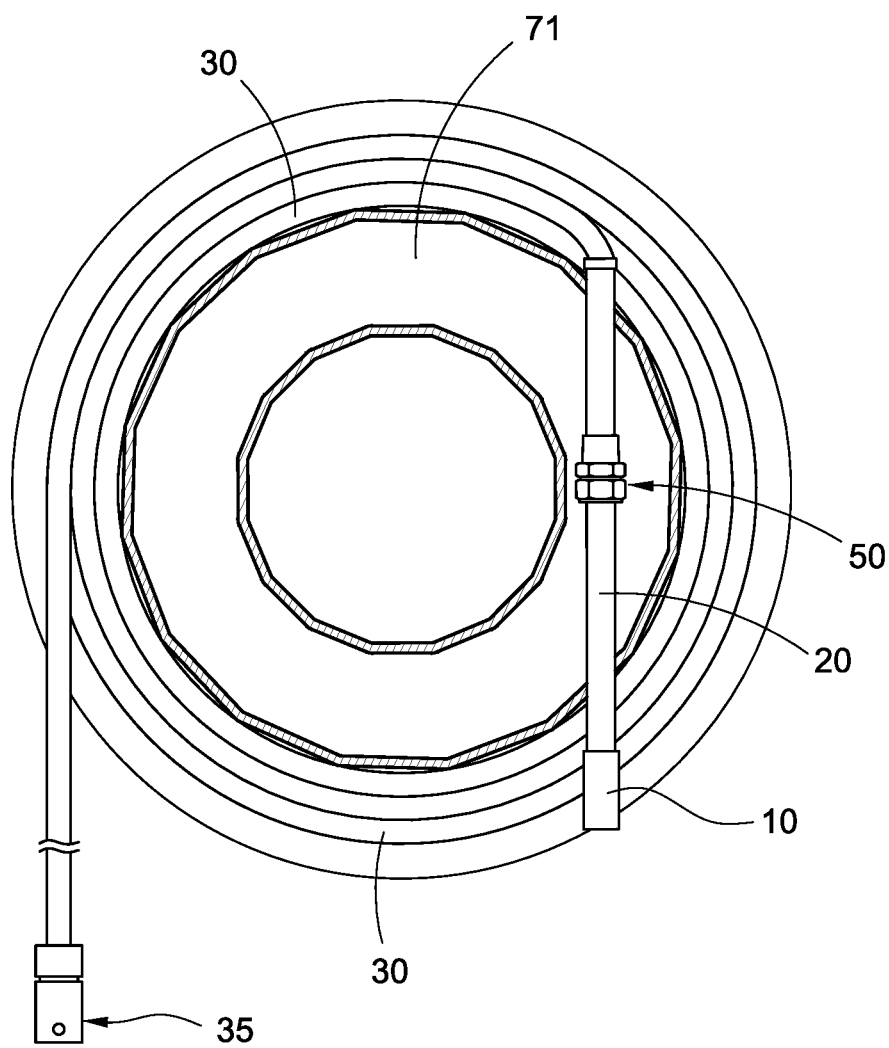
FIG. 4 is a cross-section view of the liquid level sensing device with a double-layer flexible tube of the invention in a wound status.

Please refer to FIGS. 3 and 4. The packing structure for storing the liquid level sensing device with a double-layer flexible tube includes a storage box 60 and a reel 70. The liquid level sensing device 1 is stored in the reel 70 first, and then placed in the storage box 60.

The storage box 60 includes a box body 61 and partition plates 62 disposed in the box body 61 for dividing the inside of the box body to form a receiving room 600. In this embodiment, the box body 61 includes a bottom box 611 and a cover 612. The partition plates 62 are disposed in the bottom box 611. The cover 612 covers the box body 61 to cover the receiving room 600. Preferably, the box body 61 is of a cuboid shape. The partition plates 62 are surroundingly arranged at four corners in the box body 61. The partition plates 62 serve as an anti-vibration structure to absorb unexpected vibration or falling for protection.

Further, the reel 70 is placed in the receiving room 600. The reel 70 includes a hollow shaft 71 and a pair of annular plates 72 disposed on two opposite sides of the hollow shaft 71. Outer peripheries of the pair of annular plates 72 project from the hollow shaft 71 to form a winding room 700. The liquid level sensing device 1 is stored in the winding room 700 by winding the double-layer flexible tube 30 onto the hollow shaft 71. The outer tube fastener 30 is exposed outside the pair of annular plates 72.

Preferably, an outer side of at least one of the annular plates 72 is formed with at least one recess 720. The outer tube fastener 10 may also be positioned in the recess 720 to prevent from being damaged when moving or vibrating.

In this embodiment, the box body 61 is formed with positioning sheets 613 in the receiving room 600. The positioning sheets 613 are located in the center of the receiving room 600 to position the hollow shaft 71. An annular room 601 is defined between the partition plates 62 and the positioning sheets 613 to accommodate the annular plates 72.

Figure 5:
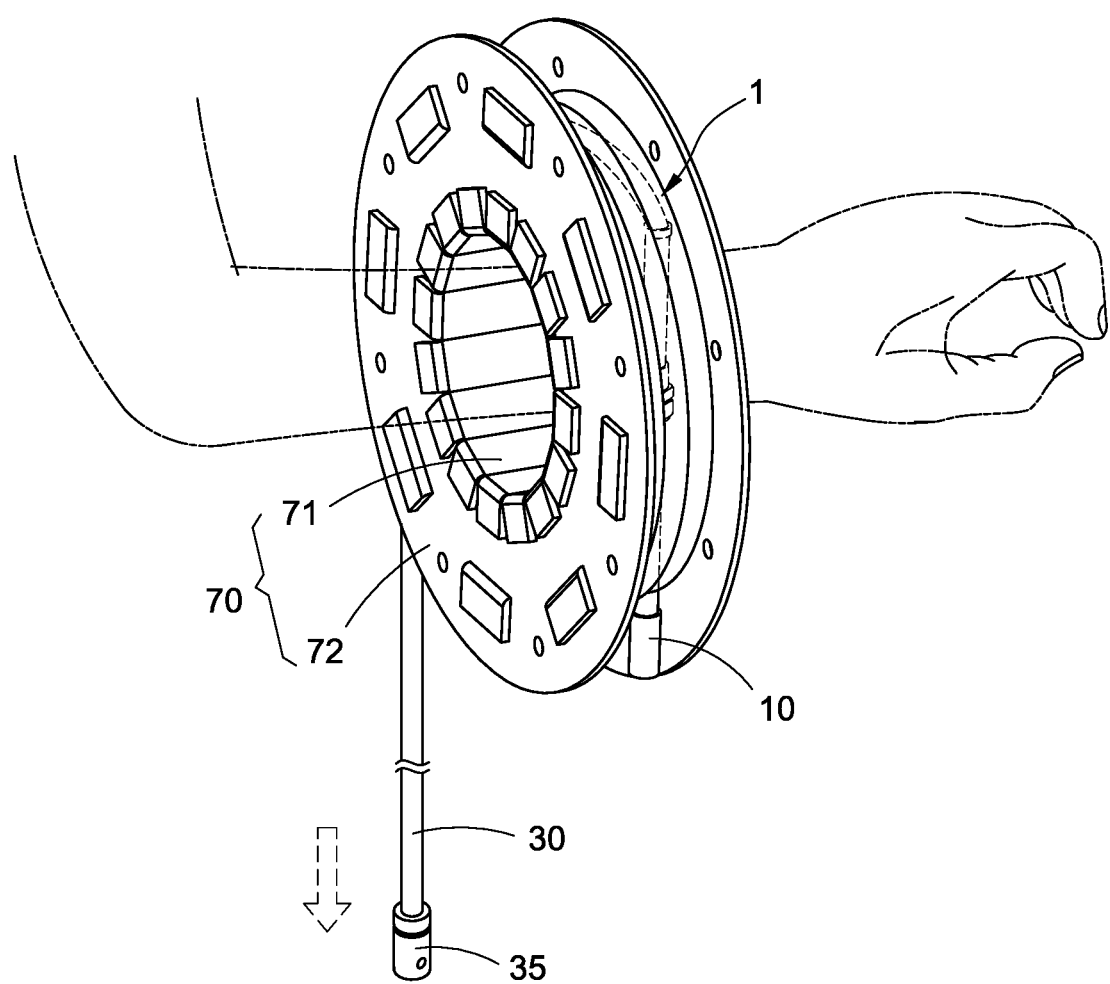
FIG. 5 is a schematic view of the liquid level sensing device with a double-layer flexible tube of the invention in use.

Please refer to FIG. 5. As shown, the liquid level sensing device 1 with a double-layer flexible tube is wound on the reel 70. When using, take the reel 70 out of the storage box 60 first, then a user passes his/her arm through the hollow shaft 71 or puts the hollow shaft 71 on his/her shoulder to carry the liquid level sensing device 1 with a double-layer flexible tube to a place to be measured.

Please refer to FIG. 6. The liquid level sensing device 1 with a double-layer flexible tube of the invention can be used to measure a level of stored liquid 3 in a tank 2. When installing, put the hanger 35 and a weight 4 hung therefrom in the tank 2 first, then rotate the hollow shaft 71 in FIG. 5 to make the double-layer flexible tube 30 slowly sunk in the tank 2, and finally make the connecting head 51 and the connecting base 52 grip two sides of a wall of the tank 2 to perform measurement.

In practice, the outer tube fastener 10 connects to a signal module 15. A magnetic floater 43 is assembled outside the double-layer flexible tube 30. The hanger is connected to another end of the double-layer flexible tube. Also, the flexible liquid level sensing device 1 utilizes resistance change between the sensor 42 and the magnetic floater 43 to send signals to the signal module 15. The magnetic floater 43 floats on the stored liquid 3 and may be a coil, a solenoid, a Hall element or a fully enclosed impervious float.

It will be appreciated by persons skilled in the art that the above embodiment has been described by way of example only and not in any limitative sense, and that various alterations and modifications are possible without departure from the scope of the invention as defined by the appended claims.

What is claimed is:

1. A liquid level sensing device comprising:
   an outer tube fastener;
   a protective soft tube, mechanically connected to the outer tube fastener;
   a double-layer flexible tube, an end thereof being mechanically connected to the protective soft tube, comprising a flexible conductive outer tube and a fluorine-containing plastic inner tube coaxially attached in the flexible conductive outer tube, the fluorine-containing plastic inner tube being made of a flexible material, the flexible conductive outer tube being made of a conductive flexible material to form a grounding layer;
   a sensing module, one portion thereof disposed in the fluorine-containing plastic inner tube, another portion thereof disposed in the protective soft tube, and comprising a circuit board and a plurality of sensors mounted on the circuit board;
   a magnetic floater, assembled outside the double-layer flexible tube, and changing a detecting resistance value of the sensors when moving;
   a hanger, mechanically connected to another end of the double-layer flexible tube; and
   a connecting assembly, disposed on the protective soft tube, and comprising a connecting cap and a connecting base detachably connected with each other.

2. The liquid level sensing device of claim 1, wherein the fluorine-containing plastic inner tube is made of a polymer material with corrosion resistance and strong acid and alkali resistance.

3. The liquid level sensing device of claim 2, wherein the fluorine-containing plastic inner tube is not conductive and is primarily made of plastic containing fluorine, and the plastic containing fluorine is polytetrafluoroethylene (PTFE), polychlorotrifluoroethylene (PCTFE), polyvinylidene fluoride (PVDF), ethylene-tetrafluoroethylene copolymer (ETFE), ethylene-chlorotrifluoroethylene copolymer (ECTFE), polyfluoride ethylene (PVF), tetrafluoroethylene-perfluoroalkyl vinyl ether copolymer, tetrafluoroethylene-hexafluoropropylene copolymer or tetrafluoroethylene-hexafluoropropylene-perfluoroalkyl vinyl ether copolymer.

4. The liquid level sensing device of claim 1, wherein the flexible conductive outer tube is flexible metal woven mesh.

5. The liquid level sensing device of claim 1, wherein the flexible conductive outer tube is made of rubber mixed with conductive graphite or a polymer material containing conductive particles.

6. A packing structure for storing the liquid level sensing device as claimed in claim 1, comprising:
   a storage box, comprising a box body and partition plates disposed in the box body for dividing an inside of the box body to form a receiving room; and
   a reel, placed in the receiving room, comprising a hollow shaft and a pair of annular plates, outer peripheries of the pair of annular plates projecting from the hollow shaft to form a winding room, the liquid level sensing device being stored in the winding room by winding the double-layer flexible tube onto the hollow shaft, and the outer tube fastener being exposed outside the pair of annular plates,
   wherein an outer side of at least one of the annular plates is formed with at least one recess.

\* \* \* \* \*